Feb. 20, 1934.　　　　W. H. YOUNG　　　　1,948,229
SCROLL SAW
Filed Oct. 11, 1933　　　　2 Sheets-Sheet 1

INVENTOR.
Walter H. Young
BY
Bunis, Wadsworth & Lightfoot
ATTORNEYS

Feb. 20, 1934. W. H. YOUNG 1,948,229
SCROLL SAW
Filed Oct. 11, 1933 2 Sheets-Sheet 2

INVENTOR.
Walter H. Young
BY
ATTORNEYS.

Patented Feb. 20, 1934

1,948,229

UNITED STATES PATENT OFFICE 1,948,229

SCROLL SAW

Walter H. Young, Detroit, Mich.

Application October 11, 1933. Serial No. 693,191

18 Claims. (Cl. 143—70)

This invention relates to jig or scroll saws of the type disclosed in my co-pending application, Serial No. 621,557, filed July 9, 1932, of which this application is a continuation in part, the object of this invention being to provide for the combination of a jig saw with a motor of the general characteristics found in the motor forming the subect matter of the aforesaid application, which characteristics are eminently adapted to effect a distinctive and highly desirable operation of a saw blade at a reciprocatory frequency not hitherto accomplished by crank operation of a saw blade or other mechanical operations thereof heretofore suggested in the art of sawing to which this application applies.

It is a further object to provide for the utilization of a type of motor singularly adapted to that purpose, for the application of power to a scroll-saw blade in its cutting direction in a highly efficient manner whereby such power is principally directed to overcoming resistance of the work to the actual cutting operation as distinguished from the retractive movement of the blade upon completion of the cutting stroke.

Still further objects and advantages, subsidiary or incidental to the aforesaid objects, or resulting from the construction or operation of the invention as it may be carried into effect, will become apparent as the said invention is hereinafter further disclosed.

In carrying the said invention into effect, I may provide in combination with the saw blade of a scroll saw, a motor of a magnetic vibratory type having a magnet capable of being excited at high frequency by a pulsating or alternating electric current, and an armature connected to the scroll-saw blade, said armature being vibrated at high frequency under the influence of the said magnet and in the direction of the length of said blade; the pull of the magnet being effected in the direction of the teeth of the blade. All of which is more particularly described and ascertained hereinafter, by way of example, having reference to the embodiment of the invention illustrated in the accompanying drawings, wherein:

Similar characters of reference indicate similar parts in the several figures of the drawings.

Figure 1:
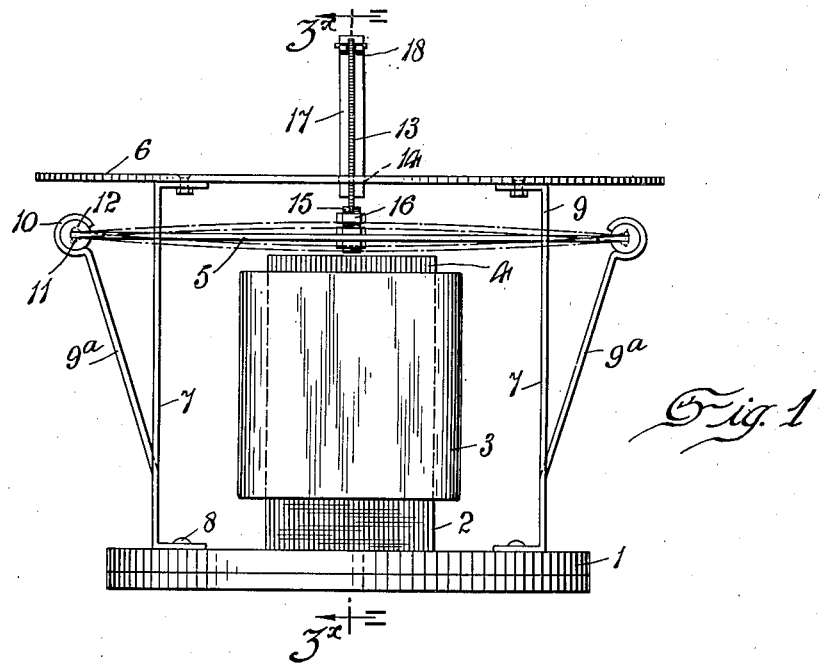
Figure 1 is an elevation of a jig or scroll saw involving the said combination.
Figure 2:
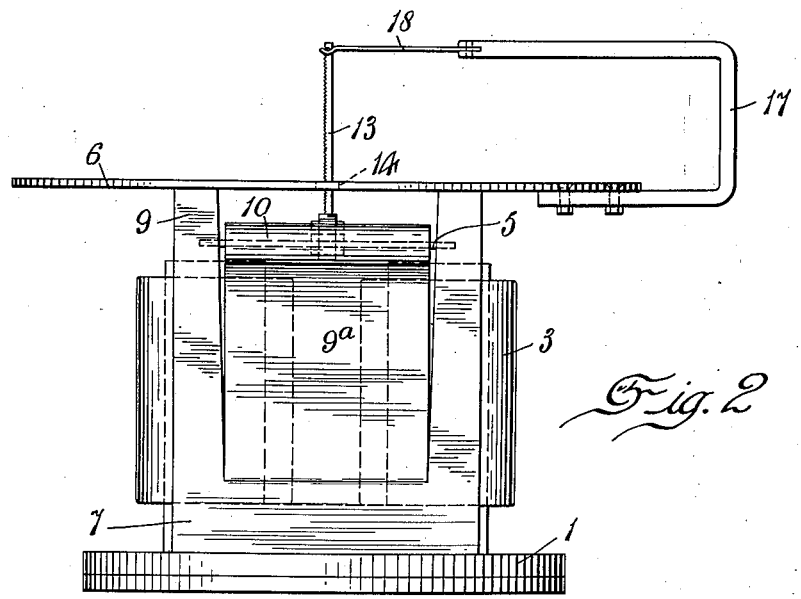
Figure 2 is a side elevation of the same.
Figure 3:
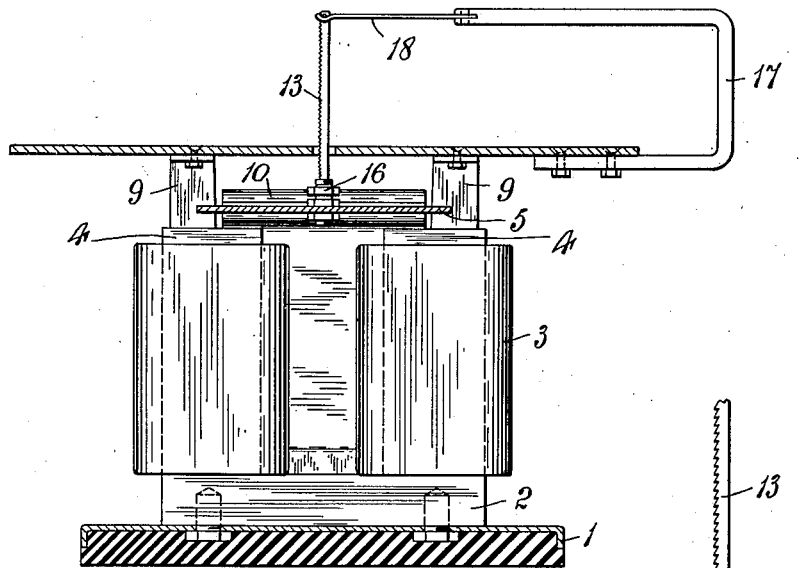
Figure 3 is a vertical sectional view taken cn the line $3^x$—$3^x$ of Figure 1.
Figure 4:
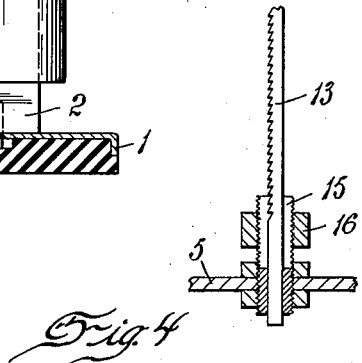
Figure 4 is a vertical sectional detail view of the connection between the saw blade and magnet armature.

The particular type of motor described in the co-pending application referred to is illustrated to show an acceptable carrying out of the principles involved in this invention, 1 indicating a base upon which is mounted an electro-magnet having a laminated U-shaped core 2 with pole pieces 4. The magnet windings 3 are intended to receive alternating or pulsating electric charges of a more or less high frequency. In the case of alternating current the common frequency of 25 or 60 cycles per second is contemplated to set up an intermittent magnetic condition in the pole pieces, as will be well understood.

5 is a vibratory armature which may be of any suitable construction to respond to the high frequency magnetic attraction of the pole pieces 4, and this armature is suitably influenced to return to or somewhat beyond its normal position during the periods when no magnetic attraction is effective, in the present instance this influence being a springing or resilient quality of the armature either inherent as the result of it being constructed of spring steel, or of a naturally resilient metal or material, or the result of its being held at its extremities in a manner inducing tension in the armature when flexed from its normal position by the magnetic attraction.

The said armature 5 is shown as being supported beneath a work table 6 which is mounted on metal standards 7 disposed on opposite sides of the magnet and secured to the base 1 by screws 8. The upper portions of the said standards are trifurcated to form the table-carrying arms 9 and intermediate armature supporting arms 9ª. The upper part of each of the arms 9ª is bent to form a sleeve 10 having an opening through which the extremity of the armature extends into the sleeve. Each extremity of the armature is received and preferably secured in the slots 11 of cylindrical members 12 housed in the said sleeves 10. These members are preferably of resilient or elastic material, such as rubber, and the arms 9ª may also be of a spring-like or resilient nature so that they may flex slightly, in response to the movements of the armature, in order to afford the influence determining the reaction of the armature to the periodic magnetizing of the pole pieces 4 or to assisting such reaction.

From this it will be apparent that the motion of the said armature, other than that directly induced by the magnetic attraction, may be the result of resilient qualities in the armature itself or in the support of the armature or of both of these conditions, the precise method of effecting control of the armature movement being subject to the dictates of design or expediency; the important characteristic of the armature being that it shifts or vibrates at a high rate of speed determined by a high frequency intermittent magnetic force to which it is subjected.

This characteristic movement lends itself excellently to the operation of a saw blade 13 which is shown as being attached to the armature as by means of a split and threaded stud 15 provided with a clamping nut 16, as will be well understood. The upper end of the blade, if sufficiently short, may be free, but I prefer to connect it to a resilient support, such as the spring 18 carried by the goose-neck arm 17, this spring 18 being capable of vibration or flexing at high frequency to agree with the flexing or movement of the said armature 5.

It will be obvious from the foregoing that the high frequency flexing or vibrating of the armature will produce a characteristic high speed longitudinal vibration or movement of the saw blade 13, and, although not necessarily so, the amplitude of such movement may be quite small, even to the extent that the ball of the thumb may be held thereagainst without injury, but nevertheless work held against the surface of the table may be cut by the saw in a rapid and highly satisfactory manner. The operation of the saw is such that it lends itself also to the cutting of such materials as rubber without difficulty.

It is usual in jig or scroll saws to use a saw blade in which the teeth project downwardly, that is, in the direction of the work table, and it will be noticed that the pulling effect of the magnet on the armature is in that direction, so that, with a magnet of sufficient power, a very strong pull in such direction on the blade may be secured to perform the actual cutting stroke of the saw against whatever resistance the work may offer, whereby tendency of the blade to stick on its cutting stroke is largely overcome. On the other hand, such energy or power is not usually called for on the return stroke of the blade, and this return stroke is, therefore, effected by the mechanical reaction of the armature and of the spring 18 without additional power input to the device.

It will be noted that, with the particular form of electro-magnet illustrated in this example, the passage of an alternating current of, say, 60 cycles through the windings thereof would energize the magnet twice during each cycle so that the armature would be subjected to magnetic attraction 120 times per second with corresponding movement of the saw blade; and that the freedom from moving parts, such as cranks or levers, with consequent freedom from the inclusion of parts subject to useless and limiting inertia, renders the utilization of such speeds and vibratory effects in a jig saw quite feasible and advantageous.

It will also be understood that the characteristic of primary importance is the speed of reciprocation which, with a 60-cycle current applied to the magnet, amounts to 7200 strokes of the saw per minute. This not only means a high average cutting speed but a high speed recovery or retractive movement of the blade. Thus a very smooth cut is not only attained but quick changes of direction of the cut are possible without twisting of the saw blade such as results in breakage in ordinary cases. Where a fine saw or a comparatively smooth edged tool is used, the pull of the magnet in the cutting direction of the tool is not of such importance as with a coarse tool, in fact with fine saws the teeth may be reversed as to direction without material difference in the cutting efficiency.

To obtain the most effective vibratory movement of the armature, as far as conversion of electric power into armature motion is concerned, it is desirable that the said armature should have a vibratory period, either natural or determined by outside influences, such as the resilient nature of its supports, substantially synchronized with the impulse frequency of the magnet. In other words, the armature should be "tuned" to agree with such frequency.

Although primarily the combination herein described is intended for use with saw blades, it lends itself to the use of other cutting tools such as knives, which are, in effect, really fine saws, and the high frequency sawing effect may in such cases be used to advantage.

This invention may be developed within the scope of the following claims, without departing from the essential features of the said invention, and that it is desired that the specification and drawings be read as being merely illustrative, and not in a limiting sense, except as necessitated by the prior art.

What I claim is:

1. In combination, a saw table, a reciprocally supported saw blade extending through said table, a high-frequency electro-magnet beneath said table, a flexible leaf-spring armature having its mid portion exposed to the field of said magnet and operatively connected to said saw blade, and means supporting the ends of said armature.

2. In combination, a saw table, a reciprocally supported saw blade extending through said table, a high-frequency electro-magnet beneath said table, a flexible leaf-spring armature having its mid portion exposed to the field of said magnet and operatively connected to said saw blade, said armature having a vibratory period substantially timed to the frequency of said electro-magnet, and means supporting the ends of said armature.

3. In combination, a saw table, a reciprocally supported saw blade extending through said table, the teeth of said blade being directed toward said table, an armature connected to said blade beneath said table, and high frequency magnetic means vibrating said armature in the direction of the length of said blade, said means being positioned beneath said armature to effect a pulsating pull thereon in the direction of the cutting teeth of said blade, said armature having a vibratory period substantially timed to the frequency of said electro-magnet.

4. In combination, a saw table, a reciprocally supported saw blade extending through said table, a flexible leaf-spring armature, means supporting the ends thereof, and a high frequency electro-magnet presented to the mid portion of said armature to exert a pulsating pull thereon in the direction of the cutting teeth of said blade.

5. In combination, a saw table, a reciprocally supported saw blade extending through said table, a flexible leaf-spring armature, means supporting the ends thereof, and a high frequency electro-magnet presented to the mid portion of said armature to exert a pulsating pull thereon in the direction of the cutting teeth of said blade, said armature having a vibratory period substantially timed to the frequency of said electro-magnet.

6. A magnetic cutting tool comprising a base, an electric magnet on said base, a leaf-spring armature extending across said magnet thereabove, standards rising from said base at opposite sides of said magnet and carrying the extremities of said armature, a table member positioned above said armature, means supporting said table member upon said base, and a cutting blade centrally attached to said armature and rising through an opening in said table member.

7. A magnetic cutting tool comprising a base, an electro-magnet on said base, a leaf-spring armature extended across and above said magnet for co-action therewith, a pair of standards rising from the base at opposite sides of the magnet, a pair of sleeves respectively carried by the upper ends of said standard and formed with slots opening toward each other and extending from end to end of said sleeves, a pair of elastic keepers individually inserted in said sleeves and slotted for engagement by the extremities of said armature, a table member positioned above said armature, means supporting said table member upon said base, and a cutting blade attached substantially contrally to said armature and freely rising through an opening in said table.

8. A magnetic cutting tool comprising a base, an electro-magnet on said base, an armature coacting with said magnet above the latter, a cutting blade attached to and rising from said armature, a table member positioned above said armature and apertured to accommodate said blade, and a pair of standards rising from said base at opposite sides of said magnet, and forming a common support for said armature and table member.

9. A magnetic reciprocatory tool comprising an electro-magnet, a leaf-spring armature having its mid portion disposed in the field of said magnet, a pair of sleeves formed with slots opening toward each other and receiving the extremities of said armature, a pair of elastic keepers individually inserted in said sleeves and slotted for engagement by the armature extremities, a member attached to and reciprocatory by the mid portion of said armature to do work, and means for supporting said sleeves in a substantially fixed relation to said magnet.

10. A magnetic reciprocatory tool comprising an electro-magnet, a leaf-spring armature having its mid portion disposed in the field of said magnet, a pair of sleeves formed with slots opening toward each other and receiving the extremities of said armature, means within said sleeves for yieldably supporting the armature extremities, a member attached to and reciprocatory by the mid portion of said armature to do work, and means for supporting said sleeves in a substantially fixed relation to said magnet.

11. A magnetic reciprocatory tool comprising an electro-magnet, a leaf-spring armature having its mid portion disposed in the field of said magnet above the latter, a member attached to and reciprocatory by the mid portion of said armature to do work, a table member positioned above said armature and apertured to accommodate said reciprocatory member, a pair of standards at opposite sides of said magnet, supporting said table member and having openings through which the end portions of said armature freely extend, and a pair of members carried one by each of said standards engaging and supporting the armature extremities in outwardly spaced relation to said standards.

12. In an electric reciprocating motor, the combination with a work table and an electro-magnet beneath said table, a pair of sheet metal standards supporting said table, at opposite sides of said magnet, a leaf-spring beneath said table and above said magnet and flexible to and from said magnet accordingly as the magnet is energized or deenergized, a member attached to and reciprocating by said armature to do work, and a pair of flexible arms having lower end portions secured respectively to said standards and having free upper end portions engaging and supporting the extremities of said spring, said arms being flexible to and from the magnet to permit such variation in the distance between the extremities of said spring as is incidental to flexure of said spring.

13. In combination, a periodically energizable electro-magnet, a vibratory armature positioned in the field of said magnet, said armature being mounted to provide for rapid vibration of small amplitude, a saw table, a reciprocably mounted saw extended through said table, said saw having an end connected to said armature for rapid short stroke reciprocation.

14. In combination, a periodically energizable electro-magnet, a vibratory armature positioned in the field of said magnet, said armature having a plurality of spaced mountings providing for flexure in opposite directions of said armature, a saw table, a reciprocably mounted saw extending through said table, said saw being connected with said armature for rapid short stroke reciprocation.

15. A magnetic reciprocatory motor comprising a periodically energizable electro-magnet, a plate-like resilient flexible vibrating member having its mid portion vibrated by said electro-magnet, spaced resilient mountings for said vibrating member engaging the margin thereof, and a work performing means operatively connected with said vibrating member.

16. An electric reciprocatory motor comprising a frame, an electro-magnet energizable by alternating current to produce an alternating magnetic field, said magnet being rigidly supported by said frame and having its pole pieces disposed in substantially the same plane, a vibratory armature, spaced mountings for said armature carried by said frame, said armature comprising an elongated substantially flat plate of resilient magnetic metal disposed substantially parallel to the plane of said pole pieces, with its mid portion in the field of said electro-magnet and spaced from said pole pieces, said mountings comprising elongated rubber blocks having slots to receive the ends of said plate, said frame having recesses to receive said blocks, the mid portion of said plate being vibrated by the alternating field of said electro-magnet to rapidly flex said plate, and a work member attached to and reciprocable by the mid portion of said plate.

17. In combination, a periodically energizable electro-magnet, a resilient plate-like vibrating member, flexed by said electro-magnet, work performing means operatively connected with said vibrating member for operation thereby, mountings for said plate-like vibrating member engaging spaced marginal portions thereof, said mountings engaging opposed faces of said marginal portions and constructed to provide for movement of said marginal portions relative to said mountings due to the flexing of said vibrating member in opposite directions.

18. In combination, a periodically energizable electro-magnet, a vibratory armature rapidly vibrated by said magnet, mounting means for permitting flexure in opposite directions of said armature, a saw table and a reciprocably extending saw blade extending through said saw table, said blade having an end connected to said armature for rapid reciprocation in the direction of the length of said blade.

WALTER H. YOUNG.